Oct. 14, 1958     G. H. MULLER     2,856,198

MOTOR VEHICLE WHEEL SUSPENSION

Filed March 7, 1956

G. H. MULLER
INVENTOR.

BY *E. C. McRae*
*J. R. Faulkner*
*L. H. Oster*

ATTORNEYS

United States Patent Office 2,856,198
Patented Oct. 14, 1958

2,856,198

MOTOR VEHICLE WHEEL SUSPENSION

George H. Muller, Northville, Mich., assignor to Ford Motor Company, Dearborn, Mich., a corporation of Delaware Application March 7, 1956, Serial No. 570,043

7 Claims. (Cl. 280—96.2)

This invention relates generally to motor vehicles, and particularly to an independent front wheel suspension for a motor vehicle.

The present invention is directed to a motor vehicle front wheel suspension incorporating a tubular type hydraulic shock absorber and telescopic control member functioning as a shock absorber and also as a control member to assist in supporting and guiding the road wheel. The upper end of the telescopic control member is resiliently connected to a sprung portion of the vehicle, and the lower portion is universally connected by means of a ball joint connection to a suspension arm pivotally mounted upon the vehicle. The front wheel spindle is rigidly mounted upon the control member directly above the ball joint connection. Steering movement of the front wheel is thus effected by rotation between the two cylindrical elements of the telescopic control member, and the ball joint permits the necessary angular movement as the road wheel rises and falls during wheel jounce and rebound. While a conventional coil suspension spring may be used between the lower cylinder of the telescopic control member and the vehicle, the construction also permits the use of an air spring as the principal spring medium, a small coil spring being used to carry only part of the load.

Other objects and advantages of this invention will be made more apparent as this description proceeds, particularly when considered in connection with the accompanying drawings, wherein.

Figure 1:
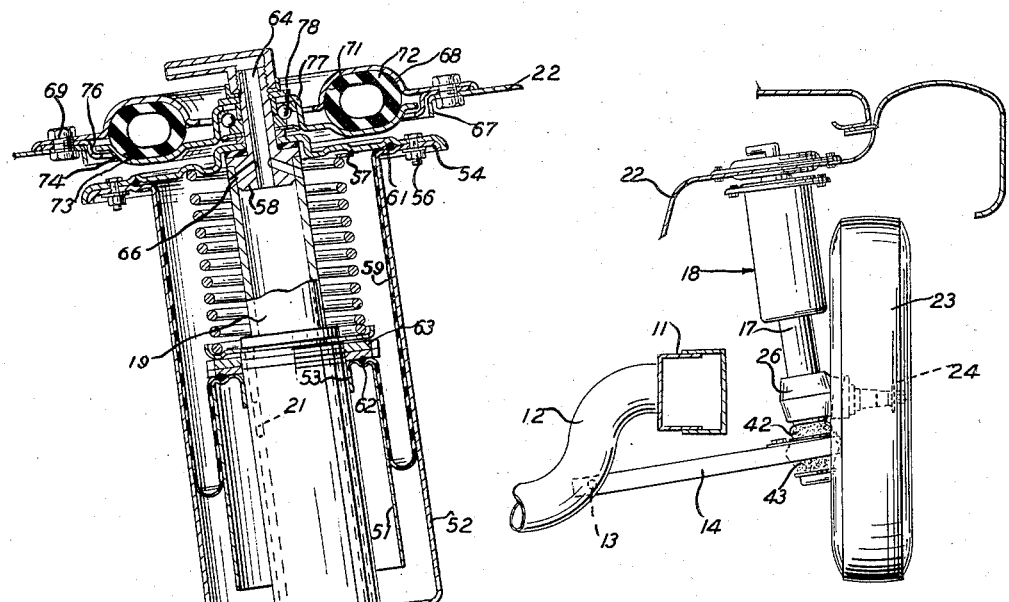
Figure 1 is a fragmentary front elevational view of a motor vehicle incorporating the present invention.

Referring now to the drawings, the reference character 11 indicates a side frame rail of a motor vehicle. A transversely extending tubular cross frame member 12 is welded to the side frame rail 11 and pivotally supports a wishbone type suspension arm 14 by means of resilient bushings 13. At its outer end the suspension arm 14 is connected by means of a ball joint connection, to be described more in detail hereinafter, to the lower end of an outer cylinder 17 forming part of a combined hydraulic shock absorber and telescopic control unit 18. Telescopically received within the outer cylinder 17 is an inner cylinder 19. Bearings 21 are provided between said inner and outer cylinders 19 and 17. The upper end of the inner cylinder 19 is flexibly connected to a body panel 22, which may be part of a unitary frame and body structure, or which may be the body portion of a regular detachable frame construction.

The front road wheel 23 is conventionally rotatably mounted upon a wheel spindle 24. The wheel spindle 24 is formed with an integral cylindrical portion 26 sleeved over the outer cylinder 17 and rigidly welded thereto. Thus it will be seen that steering movement of the road wheel 23 takes place about the axis of the telescopic control unit 18, and results in rotation of the outer cylinder 17 and the inner cylinder 19.

The lower end of the outer cylinder 17 extends a considerable distance beneath the cylindrical portion 26 of the wheel spindle 23, and projects through a cylindrical opening 27 formed in the upper flange 28 of the suspension arm 14. The arm 14 is a stamped arm, and is formed adjacent the opening 27 with a downwardly depending flange 29 of spherical shape, the axis of the spherically shaped flange 29 being at the point 31 centrally of the opening 27 on the plane of the upper surface of the flange 28 of the suspension arm. It will be noted that the spherical flange 29 is inset from the periphery of the outer end portion of the suspension arm to form a continuous marginal flange on the suspension arm contributing to the strength and rigidity of the unit.

This construction permits the ball joint center to be lowered as much as possible to increase the roll center height, and to eliminate the need for a stabilizer bar. The low mounting of the ball joint also permits a maximum size oil reservoir in the shock absorber, and enables the bearings in the shock absorber to be spaced vertically a maximum distance for stability.

Cooperating with the downwardly depending spherical flange 29 is a plate 32, secured to the horizontal flange 28 of the suspension arm 14 by means of a plurality of bolts 33. The plate 32 is likewise formed with a cylindrical opening and with an integral upwardly projecting spherically shaped flange 34 having its center located at 31. A split spherical bearing shell 36 serves as a liner for the spherically shaped flanges 29 and 34 to form a socket for a bearing member 37 which may be grooved if desired. The bearing member 37 is sleeved over the reduced end portion 38 of the lower cylinder 17 and is held in position against the shoulder 39 by means of a retaining ring 41. The outer surface of the bearing member 37 is spherical, having a center at 31, and engages the split bearing shell 36 carried by the flanges 29 and 34, to complete a ball joint assembly between the suspension arm and the telescopic control member.

The ball joint assembly is protected from foreign matter by a pair of flexible rubber boots 42 and 43. The lower end of the upper boot 42 is held by an annular retaining ring 46 mounted upon the plate 32 carried by the suspension arm. The upper end of the upper boot 46 is free to rotate by means of a bearing ring 44 bonded to the boot and slidably received within an annular groove machined in the lower face of the spindle support 26.

In a similar fashion the upper end of the lower boot 43 is held by an annular retaining ring 47 mounted upon the upper flange 28 of the suspension arm. The lower end of the lower boot 43 is free to rotate by means of a bearing ring 48 bonded to the boot material and slidably received within an annular groove machined in the shock absorber lower cylinder cap 49. The bearing rings 44 and 48 are held in their respective grooves by the inherent resiliency of the boots.

It will be seen that the ball joint assembly accommodates turning movement of the road wheel and wheel spindle and also the relative movement resulting between the telescopic control member and the suspension arm during wheel jounce and rebound.

A grease fitting 50 may be provided in the spindle support 26 to provide lubrication for the ball joint assembly if desired.

The inner and outer cylinders 19 and 17 may be internally provided with cooperating piston and valve structure to form a tubular type shock absorber (not shown). The front wheel suspension may, if desired, be provided with a conventional coil suspension spring between the lower cylinder 17 and the upper cylinder 19 or the vehicle body panel 22, but in the present instance the unit is shown with an air spring design as the main springing medium in combination with a small coil spring. The opposite ends of the coil spring are anchored, and prevent relative rotation between the cylinders 17 and 19. This is accomplished by providing inner and outer cylinders 51 and 52 respectively encircling the upper portion of the telescopic control unit 18. The inner cylinder 51 is formed at its upper end with a return bent flange 53 welded to the upper portion of the lower cylinder 17, while the outer cylinder 52 is formed with an upper marginal flange 54 secured by means of bolts 56 to a plate 57 mounted upon the upper end cap 58 of the upper cylinder 19.

A rubber air sleeve 59 is provided. The air sleeve 59 is cylindrical and at its upper end is formed with an enlarged marginal bead 61 clamped between the flange 54 of the outer cylinder 52 and the plate 57. The opposite end of the air bag 59 is formed with an enlarged bead 62 clamped against the upper portion of the inner cylinder 51 by a pair of nuts 63 threaded on the cylinder 19. It will be noted that the air sleeve 59 lies along the inner surface of the outer cylinder 52 and also generally along the outer surface of the inner cylinder 51 with the portion thereof along each cylinder varying during rising and falling movement of the vehicle wheel.

Air under pressure from a suitable reservoir or supply unit (not shown) is furnished to the interior of the air bag 59 through passageways 64 and 66 in the end cap 58 of the upper cylinder 19. Under suitable controls, the air under pressure thus forms an air spring for the suspension unit.

As previously mentioned, the upper end of the telescopic control unit is mounted upon a body panel 22 which may form part of an integral body and frame vehicle structure or which may be part of the body of a conventional vehicle using a detachable frame. The panel 22 is formed with an opening 67 and with an annular mounting plate 68 secured to the panel by means of bolts 69. The mounting plate 68 is formed with an annular recessed portion 71 embracing a hollow resilient annulus 72 formed of rubber or other flexible material. The annulus 72 may be filled with air at low pressure or may be connected to the atmosphere. The annulus 72 is seated upon the annular depressed portion 73 of an inner mounting plate 74 and forms a resilient connection between the plates 68 and 74. Annular clips 76 are held in place by the bolts 69 and overlap the outer marginal portions of the inner mounting plate 74 to restrain separation of the plates 68 and 74 during service when the vehicle is lifted by a hoist. The inner hub 77 of the inner mounting plate 74 is rotatably mounted upon the end cap 58 of the upper cylinder 19 by means of bearings 78. The hollow annular mounting member 72 provides a resilient insulated connection absorbing shock and permitting limited angular movement between the body and the telescopic control member.

Figure 3:
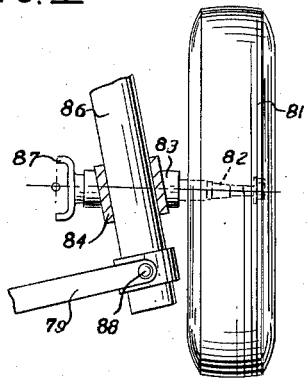
Figure 3 is an elevational view of a modification.
Figure 2:
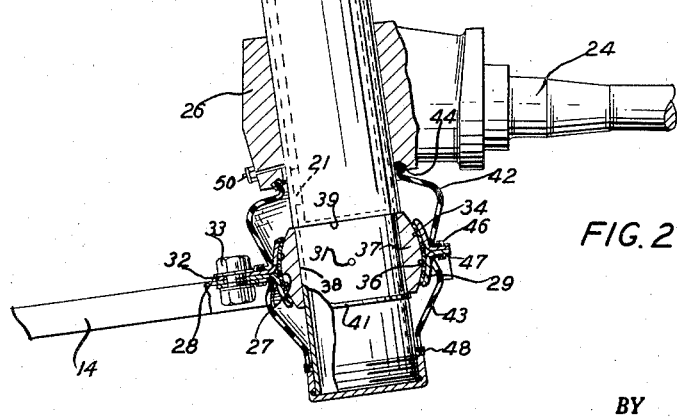
Figure 2 is a fragmentary enlarged cross sectional view of a portion of the structure shown in Figure 1.

The present invention may also be used with a rear wheel suspension, as shown in the modification illustrated in Figure 3. In this construction, the rear wheel 81 is carried on an axle shaft 82 journaled in a spindle support 83 having an offset hub 84 secured to the shock absorber 86. A universal joint 87 connects the axle shaft to a drive shaft (not shown). The lower end of the shock absorber is connected by a pin type ball joint 88 to the outer end of the suspension arm 79.

Reference is made to my copending application Serial Number 486,498, filed February 7, 1955 (now abandoned), and to my application entitled Hydro-Pneumatic Wheel Suspension Serial No. 570,045, filed March 7, 1956, and forming a continuation in part of the aforesaid copending application.

It will be understood that the invention is not to be limited to the exact construction shown and described, but that various changes and modifications may be made without departing from the spirit and scope of the invention, as defined in the appended claims.

What is claimed is:

1. In a wheel suspension for a steerable road wheel of a motor vehicle having a wheel spindle upon which said road wheel is rotatably mounted, a suspension arm pivotally connected to said vehicle and having an opening in its outer end, a spherical socket in said opening, an upper cylinder adapted to be rotatably and dependently connected at its upper end to said vehicle, a lower cylinder telescopically associated with said upper cylinder, said wheel spindle being rigidly mounted upon said lower cylinder so that steering movement of said road wheel effects rotary movement of said lower cylinder, a spherical bearing member concentrically mounted upon said lower cylinder beneath the mounting of said wheel spindle thereon, said spherical bearing member being received within the spherical socket of said suspension arm.

2. The structure defined by claim 1 which is further characterized in that the connection between the upper end of said upper cylinder and said vehicle comprises a plate carried by the upper end of said cylinder and provided with an annular depressed groove adjacent its periphery, a hollow toroidal resilient annulus seated in the groove in said plate, and a mounting plate secured to said vehicle and having an annular grooved portion overlying said resilient annulus to form a resilient mounting between said upper cylinder and said vehicle.

3. In a wheel suspension for a steerable road wheel of a motor vehicle having a wheel spindle upon which said road wheel is rotatably mounted, a suspension arm pivotally mounted on said vehicle, the outer end portion of said suspension arm being formed with a circular opening therein and with a semispherically shaped integral flange projecting in one direction from the plane of said suspension arm adjacent the margin of said circular opening, a pair of telescopically arranged cylinders the upper of which is connected to said vehicle and the lower of which is connected to said wheel spindle, said lower cylinder projecting downwardly beyond said wheel spindle and through the opening in said suspension arm, a spherical bearing member mounted upon said lower cylinder beneath the mounting of said wheel spindle thereof and universally engageable with the semispherically shaped flange of said suspension arm, and a plate secured to the outer end portion of said suspension arm and having an integral semispherically shaped flange forming a continuation of the semispherically shaped flange of said suspension arm to provide a spherically shaped socket for said bearing member.

4. The structure defined by claim 3 which is further characterized in that said wheel spindle and said spherical bearing member embrace and are rigidly connected to vertically spaced portions of said lower cylinder.

5. An independent wheel suspension for a steerable road wheel of a motor vehicle comprising a vehicle body portion, a wheel control assembly having an inner and an outer concentric cylindrical portions, said inner cylindrical portion rotatably supported at one end thereof at said body portion, a road wheel supporting spindle affixed to said outer cylindrical portion, a suspension arm having one end thereof pivotally supported at said vehicle, a universal coupling connecting the other end of said arm to said outer cylindrical portion at a point beneath said wheel spindle, said coupling including inner and outer semispherical coacting members having a common center on the center line of said cylindrical portions, said inner member affixed to said outer cylindrical portion, and said outer member affixed to said suspension arm, said outer cylindrical portion extending coaxially through and beneath said universal coupling.

6. In a wheel suspension for a steerable road wheel of a motor vehicle having a wheel spindle upon which said road wheel is rotatably mounted, a suspension arm pivotally connected to said vehicle and having an opening in its outer end, a spherical socket in said opening, an upper cylinder connected at its upper end to said vehicle, a lower cylinder mounted for rotation about its axis and telescopically associated with said upper cylinder, said wheel spindle being rigidly mounted upon said lower cylinder so that steering movement of said road wheel effects rotary movement of said lower cylinder, a spherical bearing member concentrically mounted upon said lower cylinder beneath the mounting of said wheel spindle thereon, said spherical bearing member being received within the spherical socket of said suspension arm.

7. An independent wheel suspension for a steerable road wheel of a motor vehicle comprising a vehicle body portion, a wheel control assembly having an inner and an outer concentric cylindrical portions, said inner cylindrical portion rotatably supported at one end thereof at said body portion, a road wheel supporting spindle affixed to said outer cylindrical portion, a suspension arm having one end thereof piovtally supported at said vehicle, a universal coupling connecting the other end of said arm to said outer cylindrical portion at a point beneath said wheel spindle, said coupling including inner and outer semi-spherical coacting members having a common center on the center line of said cylindrical portions, said inner member affixed to said outer cylindrical portion, and said outer member affixed to said suspension arm, said outer cylindrical portion extending coaxially through said universal coupling.

References Cited in the file of this patent

UNITED STATES PATENTS

| | | |
|---|---|---|
| 2,018,653 | Best | Oct. 29, 1935 |
| 2,325,894 | Wahlberg et al. | Aug. 3, 1943 |
| 2,624,592 | MacPherson | Jan. 6, 1953 |
| 2,684,253 | Leighton | July 20, 1954 |